United States Patent Office 3,486,965
Patented Dec. 30, 1969

3,486,965
SAG-RESISTANT GYPSUM BOARD AND
METHOD THEREFOR
Donald R. Janninck, Chicago, Ill., assignor to United
States Gypsum Company, Chicago, Ill., a corporation
of Delaware
No Drawing. Filed Nov. 21, 1966, Ser. No. 595,574
Int. Cl. B32b 1/04; E04c 1/00
U.S. Cl. 161—43                                5 Claims

ABSTRACT OF THE DISCLOSURE

A gypsum board consisting essentially of a monolithic cellular core of set gypsum and a paper cover sheet encasement with the gypsum core having incorporated therein a small amount of Prussian blue and method of producing the paper covered gypsum board.

---

This invention relates to improved gypsum board products and more particularly to gypsum boards having improved properties for use in areas subject to indirect exposure to the elements.

Gypsum board products comprising a monolithic core of set gypsum and a paper cover sheet encasement, are well known in the art. They are widely used in the construction of interior walls and ceilings and are commonly referred to as gypsum board, plaster-board and so forth. Attempts have been made to produce a moisture-resistant gypsum board suitable for use on the exteriors of buildings in areas not directly exposed to the elements such as on soffits and the underside of walkways, canopies and similar areas but commercial production of boards having suitable properties has not been economically feasible.

It is therefore one object of the present invention to provide a gypsum board particularly adapted for use on the exteriors of buildings in areas not directly exposed to the elements.

A further object of this invention is to provide an improved gypsum board having sag-resistant properties.

Another object of this invention is to provide a gypsum board having an attractive appearance and improved handling characteristics.

A further object is to provide a gypsum board having improved sag resistance without substantially increasing the brittleness thereof.

In accordance with the invention, there is provided a gypsum board consisting essentially of a monolithic cellular core of a set gypsum having included therein a small amount of Prussian blue with the gypsum core being encased in a cover sheet. As is well known, Prussian blue is formed directly by reacting a ferric ion with a ferrocyanide or by reacting a ferrous ion with a ferricyanide or indirectly by reacting an iron salt with an iron cyanide followed by appropriate oxidation or reduction. Various soluble ferrocyanide salts such as potassium ferrocyanide, calcium ferrocyanide and the like can be employed for reaction with the iron salts. Prussian blue gives a blue colloidal dispersion with water and imparts a blue color to the said gypsum core.

The gypsum board can be made in conventional manner with the Prussian blue being incorporated in the gypsum (calcium sulfate dihydrate) core in an amount from about 0.15 to about 1.10% by weight of the gypsum and preferably in an amount of about 0.6% by weight. Conventional additives such as foams, set control agents, bonding agents and the like can be employed in regular manner to form the gypsum board. Thus, for example, an aqueous slurry of calcined gypsum can be prepared and the Prussian blue added thereto in a desired amount. Foam can then be added to reduce the density of the slurry with the resulting slurry being deposited between cover sheets of paper or the like. The gypsum boards can be prepared in any desired thickness such as, for example, ¼ inch to ⅝ inch in thickness, as is common in the building art. The gypsum board can be made in various sizes and various types of paper cover sheets can be employed to encase the board. In extreme humidity areas an aluminum foil backing may be used to achieve added protection.

For a more complete understanding of the invention, reference is made to the following specific examples which are set forth for illustrative purposes only.

EXAMPLE I

To a dry blend consisting of 2,000 grams gypsum stucco (calcium sulfate hemihydrate), 12.5 grams flour and 25 grams of paper fiber was added 1650 milliliters of gauging water and 800 milliliters of a foam prepared from 175 milliliters of water and 3.1 mililiters of foaming agent. From 1 to 5 grams of ground gypsum block was added to the dry blends as required to give a slurry setting time of 4–5 minutes as determined with a 300 gram Vicat needle. In like mixes, Prussian blue in varying amounts was added to the gauging water and all of the slurries were cast into the form of bars and cubes and allowed to set. The casts were dried at 110° F.

Sag tests were made on 1 x 1 x 12 inch bars dried to constant weight at 110° F. The bars were supported on 10 5/16 inch centers over water in a sealed case. The sag was measured in the center by a dial gauge graduated to .001 inch. The gauge mounted on a bridge over the samples imposed a load of about 75 grams. Sag readings (dry sag) were taken after about one month and then the samples were soaked in water and remounted in the test frame. Wet sag readings were then taken one month later. The results obtained are shown below:

TABLE I

| Percent of Prussian blue by weight of gypsum | Dry sag .001 inch | Wet sag .001 inch |
|---|---|---|
| 0 | 2 | 29 |
| 0.21 | 6 | 20 |
| 0.42* | 1 | 17 |
| 0.63 | 5 | 17 |
| 0.84* | 3 | 27 |
| 1.05 | 3 | 23 |

\* 0.15% boric acid was also added to the starred sample.

The gypsum bars containing 0.63 percent Prussian blue (by weight of gypsum) had a very desirable light blue color. It was also noted that the addition of boric acid tends to increase the brittleness of the finished product whereas no increase in brittleness was noted with Prussian blue.

Compressive strength tests were made on 2 x 2 inch cubes prepared as above indicated. These samples were dried to constant weight at 110° F. The samples for humidified strength tests were re-humidified to constant weight at 90° F. and 90% humidity. The compressive strength of the samples was identically determined by applying pressure thereto until the samples broke. All of the samples had good dry strength and good humidified strength with an increase thereof being achieved with the addition of Prussian blue. The results are tabulated in Table II. Compressive strength is expressed as percent of the normal compressive strength which was previously determined for a standard gypsum core of the same density.

TABLE II

| Percent of Prussian blue by weight of gypsum | Dry density | Dry compressive strength, percent of normal | Humidified compressive strength, percent of normal dry |
|---|---|---|---|
| 0 | 49.6 | 98 | 56 |
| 0.21 | 51.7 | 102 | 59 |
| 0.42 * | 51.4 | 107 | 57 |
| 0.63 | 51.6 | 101 | 57 |
| .84 * | 53.2 | 99 | 58 |
| 1.05 | 48.6 | 104 | 59 |

* 0.15% boric acid was also added to the starred samples.

EXAMPLE II

Gypsum cubes were made from the following formulation:

| | |
|---|---|
| Calcined gypsum (calcium sulfate hemihydrate) grams | 1600 |
| Paper fiber do | 20 |
| Starch do | 10 |
| Goulac gum do | 2.3 |
| Rosin soap solution milliliters | 9.0 |
| Foam water do | 171 |
| Foam volume do | 900 |
| Gauging water do | 1335 |
| Ground gypsum block gram | 1 |

In one mix 53 milliliters of a 0.15 molar solution of iron sulfate ($Fe_2(SO_4)_3$) was placed in half the gauging water and 119.5 milliliters of a 0.10 molar solution of calcium ferrocyanide ($Ca_2Fe(CN)_6$) was placed in the other half of the gauging water. The two halves were mixed just prior to adding the gypsum stucco. This represents 0.18% Prussian blue based on gypsum (calcium sulfate dihydrate).

The dry and humidified compressive strengths were identically determined with the following results:

TABLE III

| Sample | Density | Dry compressive strength, percent of normal | Humidified compressive strength, percent of normal |
|---|---|---|---|
| Control | 41.2 | 63.4 | 36.9 |
| Prussian blue mix | 40.2 | 73.8 | 42.4 |

It will be noted that Prussian blue increased the dry compressive strength of the cubes by 16.5% and the humidified compressive strength by 14.9%.

EXAMPLE III

A gypsum board was made in accordance with the conventional practice as set forth in U.S. Patent No. 2,985,219. Another gypsum board was made by the same procedure except for the addition of 0.18% Prussian blue (based on gypsum) to the gypsum slurry. The boards were tested for moisture pickup and sag by the following procedure and compared with plywood and laminated paper board.

Test panels (16" x 24") were placed in a horizontal position in a wooden frame and water was sprayed onto the samples from two hose nozzles mounted under the test samples. Testing consisted of getting initial zero dial gauge readings, then spraying the samples for 30 minutes, allowing 10 minutes for the excess surface water to drain away and then taking deflection readings again. The samples were allowed to air dry in the frame for 23½ hours after spraying and the cycle was again repeated. The rate of water spray was 2½ gallons per minute. Sample weights were obtained just prior to testing and immediately after the final drying cycle. The initial and final weights and percent moisture pickup are set forth in Table IV. The materials tested were ½ inch exterior plywood, ½ inch high density, structural laminated paper board, ½ inch gypsum board with brown sheathing back paper, a water-resistant face paper and a gypsum core containing paper fiber; and ½ inch gypsum board with brown sheathing back paper, a gray water-resistant face paper and a gypsum core containing paper fiber and Prussian blue which imparted a blue color to the core (blue core gypsum board of the present invention).

TABLE IV

| Material | Initial weight, grams | Final weight, grams | Percent moisture pickup |
|---|---|---|---|
| ½" Plywood | 1,330 | 1,495 | 12.4 |
| ½" Paper board | 1,168 | 2,012 | 72.5 |
| ½" Gypsum board | 2,339 | 2,396 | 2.4 |
| ½" Blue core gypsum board | 2,429 | 2,459 | 1.2 |

Table V gives the deflection data obtained on the above samples during the three weeks of testing.

TABLE V.—DEFLECTION DATA

| Days | Temp. and Humidity | ½" plywood After [1] drying | ½" plywood After [2] spraying | ½" blue core gypsum board After [1] drying | ½" blue core gypsum board After [2] spraying | ½" gypsum board After [1] drying | ½" gypsum board After [2] spraying | ½" paper board After [1] drying | ½" paper board After [2] spraying |
|---|---|---|---|---|---|---|---|---|---|
| 1 | 83°, 62% | 0.000 | −0.056 | 0.000 | −0.006 | 0.000 | −0.007 | 0.000 | −0.111 |
| 2 | 74°, 50% | −0.102 | −0.146 | +0.019 | +0.001 | +0.041 | +0.015 | −0.065 | −0.287 |
| 3 | 69°, 51% | −0.109 | −0.135 | +0.025 | +0.016 | +0.052 | +0.029 | −0.311 | −0.353 |
| 4 | 66°, 48% | −0.129 | −0.134 | +0.024 | +0.019 | +0.049 | +0.032 | −0.335 | −0.353 |
| 5 | 78°, 25% | −0.122 | −0.130 | +0.024 | +0.013 | +0.042 | +0.023 | +0.311 | −0.325 |
| 8 | 81°, 50% | +0.011 | −0.038 | +0.032 | +0.019 | +0.049 | +0.029 | −0.177 | −0.225 |
| 9 | 83°, 49% | −0.039 | −0.094 | −0.011 | −0.027 | +0.007 | −0.017 | −0.323 | −0.386 |
| 10 | 74°, 50% | −0.077 | −0.115 | −0.011 | −0.032 | −0.007 | −0.021 | −0.384 | −0.405 |
| 11 | 74°, 50% | −0.105 | −0.120 | −0.015 | −0.028 | −0.007 | −0.030 | −0.395 | −0.410 |
| 12 | 71°, 56% | −0.103 | −0.115 | −0.013 | −0.026 | −0.009 | −0.031 | −0.408 | −0.415 |
| 13 | 68°, 58% | −0.100 | −0.108 | −0.015 | −0.026 | −0.011 | −0.030 | −0.412 | −0.417 |
| 14 | 68°, 56% | −0.098 | −0.107 | −0.015 | −0.032 | −0.012 | −0.033 | −0.408 | −0.410 |
| 15 | 71°, 53% | −0.090 | −0.098 | −0.020 | −0.027 | −0.017 | −0.037 | −0.409 | −0.411 |
| 16 | 76°, 58% | −0.053 | −0.075 | −0.016 | −0.029 | −0.017 | −0.039 | −0.408 | −0.415 |
| 17 | 68°, 50% | −0.057 | −0.081 | −0.014 | −0.031 | −0.022 | −0.044 | −0.416 | −0.419 |
| 18 | 69°, 53% | −0.066 | −0.082 | −0.015 | −0.029 | −0.025 | −0.045 | −0.418 | −0.421 |
| 19 | 67°, 48% | −0.073 | −0.086 | −0.014 | −0.031 | −0.022 | −0.050 | −0.414 | −0.419 |
| 20 | 70°, 50% | −0.071 | | −0.009 | | −0.028 | | −0.414 | |

[1] Readings taken after specimens had drained and air dried for 23.5 hours.
[2] Readings taken after specimens had been sprayed for 30 minutes and allowed to surface drain for 10 minutes.

The paper board failed in less than one week. At that time the surface away from the spray showed water migration and after seven days, about 50% of the board was wet all the way through.

The blue core board resisted moisture better than any of the other materials tested. After the initial stabilization period, it picked up very little moisture, indicating that the Prussian blue modified board does not readily absorb moisture.

At the completion of the test, the samples were cut down the center to check for moisture migration. The gypsum board and blue core gypsum board were dry, whereas the paper board had soaked through.

The advantages of the invention will be apparent from the foregoing. As is seen, Prussian blue imparts a desirable blue color to gypsum core and increases sag resistance of the gypsum board thus rendering the gypsum board thus rendering the gypsum board adapted for exterior use in building construction where moisture presents a problem. The advantages of the invention are achieved without increasing the brittleness of the board, thus keeping production costs to a minimum by avoiding excess breakage.

Those modifications and equivalents which fall within the spirit of the invention and the scope of the appended claims are to be considered part of the invention.

I claim:
1. A gypsum board consisting essentially of a monolithic cellular core of set gypsum and a paper cover sheet encasement with the gypsum core having incorporated therein a small amount of Prussian blue.
2. The gypsum board of claim 1 in which the cellular gypsum core contains Prussian blue in an amount of from about 0.15 to about 1.10 percent by weight of gypsum.
3. The gypsum board of claim 1 in which the cellular gypsum core contains about 0.63 percent Prussian blue by weight of gypsum.
4. A method of producing paper covered gypsum board having a set core of cellular gypsum which exhibits improved sag resistance which comprises the steps of:
   (1) preparing a foamed aqueous slurry of calcined gypsum and Prussian blue,
   (2) depositing the resulting slurry between paper cover sheets,
   (3) forming the slurry and paper cover sheets into boards of the desired dimensions, and
   (4) drying the boards.
5. A method of producing paper covered gypsum board having a set core of cellular gypsum which exhibits improved sag resistance which comprises the steps of:
   (1) adding to calcined gypsum an aqueous solution of iron sulfate and an aqueous solution of a soluble ferrocyanide salt to form a gypsum slurry containing Prussian blue,
   (2) depositing the resulting slurry between paper cover sheets,
   (3) forming the slurry and paper cover sheets into boards of the desired dimensions, and
   (4) drying the boards.

References Cited

UNITED STATES PATENTS

| | | | |
|---|---|---|---|
| 3,189,511 | 6/1965 | White | 106—110 |
| 3,383,271 | 5/1968 | Roberts et al. | 161—43 |

ROBERT F. BURNETT, Primary Examiner

W. J. VAN BALEN, Assistant Examiner

U.S. Cl. X.R.

52—309; 106—110; 156—43; 161—160, 161